US005236298A

United States Patent [19]

Lehman

[11] Patent Number: 5,236,298

[45] Date of Patent: Aug. 17, 1993

[54] FORK LIFT ATTACHMENT

[75] Inventor: Marcus S. Lehman, Lake City, Minn.

[73] Assignee: Valley Craft, Lake City, Minn.

[21] Appl. No.: 748,663

[22] Filed: Aug. 22, 1991

[51] Int. Cl.[5] ............ B60B 1/12

[52] U.S. Cl. ............ 414/607; 294/110.1; 294/115; 294/119.1; 294/902; 414/619

[58] Field of Search ............ 414/607, 608, 618, 619, 414/620, 621, 622, 623, 911; 294/88, 118, 106, 110.1, 115, 902, 119.1

[56] References Cited

U.S. PATENT DOCUMENTS

| | | | |
|---|---|---|---|
| 2,497,600 | 2/1950 | Grigsby | 294/115 |
| 2,507,549 | 5/1950 | Smith et al. | 294/115 X |
| 2,591,638 | 4/1952 | Trafton | 294/110.1 X |
| 3,472,404 | 10/1969 | Ord | 414/607 X |
| 4,705,331 | 11/1987 | Britton | 294/110.1 X |
| 4,818,005 | 4/1989 | Purser | 294/115 X |
| 4,834,437 | 5/1989 | Howard, Sr. | 294/110.1 X |

FOREIGN PATENT DOCUMENTS

| | | | |
|---|---|---|---|
| 1034894 | 8/1983 | U.S.S.R. | 294/119.1 |

OTHER PUBLICATIONS

Brochure entitled "Fork Mounted Lift Truck Attachments of Valley Craft", 1990.

*Primary Examiner*—Frank E. Werner

*Attorney, Agent, or Firm*—Merchant, Gould, Smith, Edell, Welter & Schmidt

[57] ABSTRACT

An attachment for a fork lift is provided. The attachment includes two arcuate members which are pivotally connected. The arcuate members have gripping surfaces which approximate a radius of curvature of a cylindrical drum of known dimensions. The gripping members are pivoted together to pivot between open and closed positions. In the closed positions, the gripping surfaces assume the external surface of the drum.

4 Claims, 1 Drawing Sheet

FORK LIFT ATTACHMENT

BACKGROUND OF THE INVENTION

1. Field of the Invention

This invention pertains to a fork lift attachment. More particularly, this invention pertains to a fork lift attachment which enables the handling of cylindrical drums.

2. Description of the Prior Art

In the prior art, many attachments have been proposed to enable a fork lift truck to handle cylindrical drums. See, for example, U.S. Pat. Nos. 3,971,485; 3,512,670; 2,842,275; and 3,410,431.

In addition to the foregoing, Applicant's assignee is the owner of a patent for a fork lift attachment that handle drums. Specifically, U.S. Pat. No. 5,009,565 dated Apr. 23, 1991 teaches a fork lift attachment having pivoting arms (items 18 and 20 in U.S. Pat. No. 5,009,565) which terminate at first and second clamps (items 22 and 24). The device includes actuator means for selectively urging the two pivot arms toward and away from one another. The actuator means is in the form of a hydraulic circuit having hydraulic cylinders with ends 55, 57 which selectively move toward or away from one another. Additionally, Applicant's assignee markets a fork lift attachment under the name Ultra-Grip which is the subject matter of currently pending and commonly assigned U.S. patent application Ser. No. 07/697,258 filed May 8, 1991. That product includes jaws which are laterally moved apart by attachment to an actuator member which selectively urges two members toward or away from one another.

In constructing fork lift attachments for handling drums, it is desirable to provide means to prevent damage to drums. This is particularly necessary when handling plastic and fiber drums. It is an object of the present invention to provide for such an attachment.

II. SUMMARY OF THE INVENTION

According to a preferred embodiment of the present invention, an attachment for a fork lift is provided. The attachment includes a first gripping member having a gripping surface contoured to approximate a portion of a first surface of a drum to be handled. A second gripping member has a gripping surface contoured to approximate a portion of a second surface of the drum. The first and second gripping members are pivotally attached to pivot between first and second positions. In the first position, the spacing between distal ends of the gripping members is selected to pass a drum between the gripping members. In the second position, the gripping members opposing surfaces approximate the spacing of the first and second surfaces of the drum to securely capture the drum between the gripping members.

III. BRIEF DESCRIPTION OF THE DRAWINGS

IV. DETAILED DESCRIPTION OF THE PREFERRED EMBODIMENT

Figure 1:
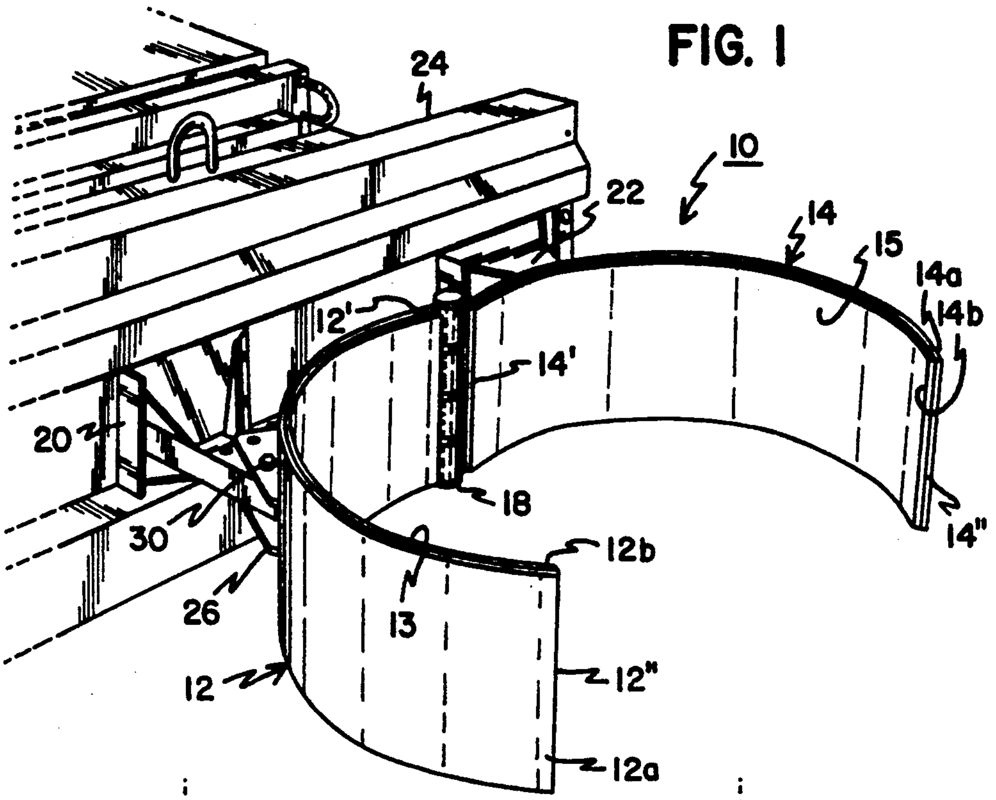
FIG. 1 is a perspective view of the attachment of the present invention.

With reference now to the various drawing figures in which identical elements are numbered identically throughout, a detailed description of the present invention will now be given. The present invention pertains to an attachment 10 having first and second gripping members 12 and 14.

In the preferred embodiment, the attachment 10 is intended to be an accessory apparatus for the fork lift attachment such as that shown in U.S. Pat. No. 5,009,565 or U.S. patent application Ser. No. 07/697,258. Each of those show an actuator member for moving two members toward and away from one another. Accordingly, the present invention assumes availability of an actuator member for moving two items toward or away from one another. The present apparatus 10 utilizes the available feature to provide a novel gripping head. For use with U.S. Pat. No. 5,009,565, the rotating clamping members are not required. Instead the clamps 12, 14 (as will be described) are attached to the distal ends of the pivoting arms of the device of U.S. Pat. No. 5,009,565.

The first gripping member 12 and second gripping member 14 are shown for use in gripping a cylindrical drum 16 of known dimensions (including a known radius, R). First gripping member 12 has a gripping surface 13 which is arcuate and has a radius of curvature equal to the radius R of drum 16. Similarly, gripping member 14 has a gripping surface 15 having a radius of curvature equal to the radius of drum 16. The gripping members 12, 14 extend from proximal ends 12', 14' to distal ends 12'', 14''. The proximal ends 12', 14' are pivotally connected at a pivot joint 18.

Figure 2:
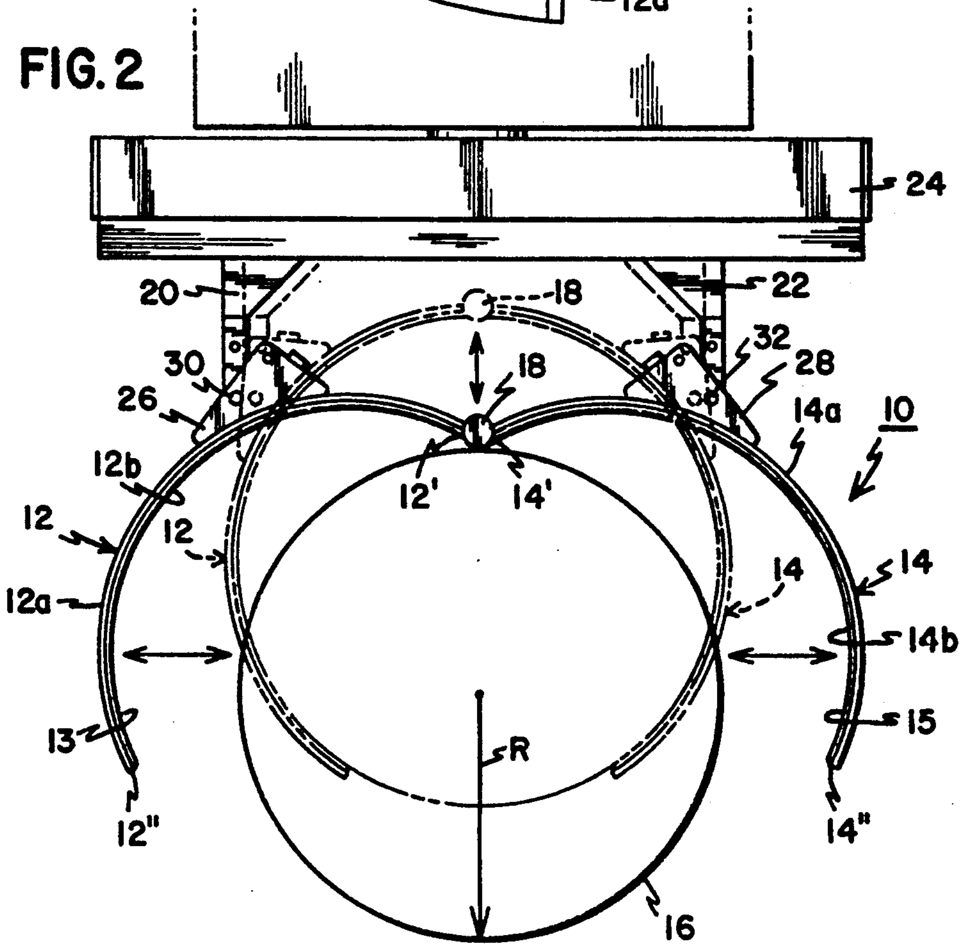
FIG. 2 is a top plan view of the attachment of FIG. 1 showing the attachment in an open or first position (shown in solid lines) and a closed or second position (shown in phantom lines).

The gripping members 12, 14 pivot around joint 18 between a first or open position (shown in FIG. 1 and in solid lines in FIG. 2) and a closed or second position (shown in phantom lines in FIG. 2).

As shown in FIG. 2, in the closed position the gripping members 12, 14 form a portion of a circle having the same radius of drum 16. The gripping members 12, 14 are sized such that their combined circumference is substantially greater than 180# such that they can substantially cover a drum 16.

Since the gripping members 12, 14 have gripping surfaces 13, 15 which are complementarily shaped to the exterior surface of drum 16, the gripping members 12, 14 snugly grasp a drum 16 when in a closed position without crushing the drum 16. The gripping members 12, 14 include metal outer shells **12*a*, 14*a* and resiliently soft inner shells 12*b*, 14*b*. The soft inner shells 12*b*, 14*b* are particularly suitable for permitting the attachment 10 to be used with handling plastic and fiber drums 16**.

The apparatus 10 includes sliding brackets 20, 22 which are slidably carried in a housing 24. Sliding brackets 20, 22 slidably received in housing 24 are shown in U.S. patent application Ser. No. 07/697,258.

Pivot brackets 26, 28 are secured to outer shells **12*a*, 14*a*. The pivot brackets 26, 28 are pivotally connected to the sliding brackets 20, 22 by pivot pins 30, 32. Accordingly, as sliding bracket 20, 22 slide toward one another, the gripping members 12, 14 pivot around pins 30, 32 and pivot relative to one another around pivot joint 18 until the gripping members 12, 14 attain the combined shape illustrated in the phantom lines of FIG. 2**.

When the sliding members 20, 22 slide apart, the gripping members 12, 14 open to the position shown in the solid lines in FIG. 2. As shown, in the first position (i.e. the solid lines of FIG. 2), the distal ends 12", 14" are spaced apart to freely receive the drums 16 (i.e., the distance between ends 12" and 14" is greater than the diameter of the cylindrical drum 16).

As an alternative of attaching the pivot brackets 26, 28 to the sliding brackets 20, 22, the brackets 26, 28 could be attached to the distal end of pivot arms carried on a fork lift attachment (such as on the distal end of pivot arms 18, 20 shown in U.S. Pat. No. 5,009,565). As the pivot arms would pivot toward and away from one another, the clamping members 12, 14 would close or open, respectively.

From the foregoing detailed description of the present invention, it has been shown how the objects of the invention have been attained in a preferred embodiment. However, modifications and equivalents of the disclosed concepts such as readily occur to those skilled in the art are intended to be included within the scope of this invention. Thus, the scope of the invention is intended to be limited only by the scope of the claims, which are, or which may hereafter be, appended hereto.

What is claimed is:

1. An attachment for a fork lift, said attachment comprising:

a housing for mounting said attachment on said forklift;

at least a first and a second mounting bracket slidably carried in said housing for sliding motion in a line of travel;

a first gripping member having a gripping surface contoured to approximate portion of a first surface of an article to be handled;

a second gripping member having a gripping surface contoured to approximate a portion of a second surface of said article;

said first and second gripping members extend from first and second, respectively, proximal ends to first and second, respectively, distal ends;

means for pivotally connecting said first and second proximal ends at a central pivot axis generally perpendicular to said line of travel for said gripping members to pivot toward and away from one another between first and second positions, said gripping members in said first positions spaced apart to receive said article between said gripping members, said gripping members in said second position urged toward one another to have composite first and second gripping surfaces approximating exterior surfaces of said article for said gripping members to securely grasp said article;

said first gripping member pivotally secured to said first mounting bracket at a first pivot axis generally perpendicular to said line of travel and generally parallel to said central pivot axis;

said second gripping member pivotally secured to said second mounting bracket at a second pivot axis generally perpendicular to said line of travel and generally parallel to said central pivot axis;

whereby said first and second gripping members move between said first and second positions as said first and second mounting brackets move along said line of travel.

2. An attachment according to claim 1 wherein said article is a generally cylindrical drum having a predetermined radius, said first and second gripping members each having arcuate gripping surfaces having a radius of curvature approximate to said radius of said drum.

3. An attachment member according to claim 1 wherein said gripping members are sized for said distal ends to be spaced apart a distance greater than a diameter of said article when said gripping members are in said second position.

4. An attachment according to claim 1 wherein said gripping members include a rigid body and a soft inner gripping surface.

* * * * *